(12) United States Patent
Fan et al.

(10) Patent No.: US 7,773,472 B2
(45) Date of Patent: Aug. 10, 2010

(54) METHOD FOR DYNAMICALLY DETECTING WRITING QUALITY OF A RECORDABLE OPTICAL DISC

(75) Inventors: Gang-Ming Fan, Hsinchu (TW); Shih-Kai Weng, Hsinchu (TW)

(73) Assignee: Lite-On It Corp., Taipei (TW)

( * ) Notice: Subject to any disclaimer, the term of this patent is extended or adjusted under 35 U.S.C. 154(b) by 480 days.

(21) Appl. No.: 11/944,582

(22) Filed: Nov. 23, 2007

(65) Prior Publication Data
US 2008/0130439 A1 Jun. 5, 2008

(30) Foreign Application Priority Data
Dec. 5, 2006 (TW) .............................. 95145231 A

(51) Int. Cl.
*G11B 7/00* (2006.01)
(52) U.S. Cl. ................................. 369/47.53; 369/53.35
(58) Field of Classification Search ........................ None
See application file for complete search history.

(56) References Cited

U.S. PATENT DOCUMENTS

| | | | | |
|---|---|---|---|---|
| 5,341,360 | A * | 8/1994 | Johann et al. ............ | 369/47.53 |
| 5,475,666 | A * | 12/1995 | Ito et al. ................... | 369/47.52 |
| 5,777,964 | A * | 7/1998 | Furuta et al. ............. | 369/47.53 |
| 5,841,747 | A * | 11/1998 | Kubota et al. ............ | 369/47.52 |
| 7,054,237 | B2 | 5/2006 | Osanai et al. | |
| 7,613,089 | B2 | 11/2009 | Lee et al. | |
| 2002/0136121 | A1 * | 9/2002 | Salmonsen et al. ....... | 369/47.53 |
| 2005/0063268 | A1 * | 3/2005 | Ninomiya ................ | 369/47.53 |
| 2005/0099917 | A1 | 5/2005 | Nakajo | |
| 2007/0081434 | A1 * | 4/2007 | Wang et al. ............... | 369/47.41 |

FOREIGN PATENT DOCUMENTS

| | | |
|---|---|---|
| TW | 563122 | 11/2003 |
| WO | 0233739 | 4/2002 |

* cited by examiner

*Primary Examiner*—Peter Vincent Agustin
(74) *Attorney, Agent, or Firm*—WPAT, PC; Justin King

(57) ABSTRACT

The present invention discloses a method for dynamically detecting writing quality of a recordable optical disc. According to the method, firstly a current detecting position located on a program area of the recordable optical disc is set. Then the recordable disc drive proceeds data recording in the program area with an optimal write power. The recordable disc drive paused data recording when a recording position exceeds or is equal to the current detecting position. Then the recordable disc drive reproduces pre-recorded data in the tracks of the recordable optical disc to perform OPC for modifying the optimal write power and calculating a jitter value. Thereafter a following detecting position is modified based on the jitter value and data recording is restarted in the program area with the modified optimal write power until the recording position exceeds or is equal to the modified following detecting position.

13 Claims, 3 Drawing Sheets

METHOD FOR DYNAMICALLY DETECTING WRITING QUALITY OF A RECORDABLE OPTICAL DISC

FIELD OF THE INVENTION

The present invention relates to a method for dynamically detecting writing quality of a recordable optical disc, and more particularly to the method that is used in a recordable disc drive which adopts running OPC.

BACKGROUND OF THE INVENTION

A recordable disc drive performs optimal power calibration (hereinafter abbreviated to OPC) before recording data on a recordable optical disc. Thereafter an optimal write power is acquired to proceed the succeeding data recording. FIG. 1 illustrates information area of a recordable optical disc. According to the regulation of the Specification (i.e. Orange Book and so on), the information area 100 of the recordable optical disc is partitioned to Power Calibration Area (PCA) 10, Program Memory Area (PMA) 20, Lead-In Area 30, Program Area 40 and Lead-out Area 50. The optical pickup head of the recordable disc drive performs OPC in the Power Calibration Area, i.e. the laser diode of the optical pickup head emits laser beams with various writing power to form test patterns in the Power Calibration Area. Thereafter reproducing the test patterns formed because of the various writing power, the recordable disc drive determines an optimal writing power and an optimal write strategy, wherein the optimal write strategy represents the driving signal of the laser diode for forming marks on the tracks of the recordable optical disc.

However, the writing quality of the recordable optical disc recorded by the recordable disc drive adopting the calculated optimal writing power is not good because below reasons:

(1) There's a time limit when performing OPC and a space limit because of a limited Power Calibration Area (PCA) which is the area for performing OPC. Once the recordable disc drive can't perform OPC thoroughly, the recordable disc drive can adopt only a few of writing powers to form corresponding test patterns and calculate the optimal writing power with interpolation based on the quality of the test patterns (2) The regulated Power Calibration Area (PCA) are located in the most inner and most outer areas of the recordable optical disc while the area between the most inner area and the most outer area is the Program Area where the recordable disc drive perform data recording. The dye thickness of the inner and outer Power Calibration Area (PCA) are not the same with the one of the Program Area due to manufacture variation of the recordable optical disc. Therefore, the writing quality of the recordable optical disc recorded with the optimal writing power calculated by the recordable disc drive may not be good.

(3) The inside temperature of the recordable disc drive is rising while data recording. Hence, the laser output power of the optical pickup head is descending due to the rising temperature. Therefore, the writing quality is getting worse because the prolonged recording process.

(4) Due to manufacture variation of the control chip and the optical pickup head of each recordable disc drive, the writing quality of each recordable disc drive varies. Thus, after data recording, even every recordable disc drive adopting the same write strategy, some recordable disc drives still have writing problem of bad quality.

To solve the above problems, disc drive manufactories usually adopt Running OPC which is performing OPC in the data area. That is, after the optimal write power is acquired in the Power Calibration Area (PCA), the recordable disc drive proceeds data recording in the program area. During the process of data recording, the recordable disc drive paused data recording after a fixed amount of data is recorded or after a fixed duration, and performs OPC based on the quality of the pre-recorded data, thereafter a modified optimal write power is acquired for the succeeded data recording. To be more specific, a fixed amount of data or a fixed duration is pre-set before Running OPC is performed. Therefore, there're some detecting positions in the program area of the recordable optical disc. For example, there're detecting positions a to i in the program area of the recordable optical disc as shown in FIG. 1. The recordable disc drive pauses data recording when the optical pickup head of the recordable disc drive reaches any of the detecting positions during the process of data recording. Then, the recordable disc drive performs OPC based on the pre-recorded data, and revises the optimal write power. Thereafter, the succeeded data recording is recorded with the modified optimal write power. Consequently, the recordable disc drive performs OPC in the program area of the recordable optical disc until the data recording is finished.

The Running OPC mentioned above improves the writing quality of the recordable optical disc effectively. However, because the recordable disc drive reaches every detecting position and performs Running OPC, the time spent for data recording are indeed prolonged. Therefore, a solution of effectively reducing the time spent for data recording and maintaining good writing quality becomes an important issue to be resolved.

SUMMARY OF THE INVENTION

It is an object of the present invention is to provide a method for dynamically detecting writing quality of a recordable optical disc, and, specially, to provide a method for dynamically determining the detecting positions on the recordable optical disc, thus the writing quality of the recordable optical disc is improved and the time spent for data recording is reduced.

In order to attain the foregoing object, a claimed invention provides a method for dynamically detecting writing quality of a recordable optical disc. Firstly a current detecting position located on a program area of the recordable optical disc is set. Then the recordable disc drive proceeds data recording in the program area with an optimal write power. The recordable disc drive paused data recording when a recording position exceeds or is equal to the current detecting position. Then the recordable disc drive reproduces pre-recorded data in the tracks of the recordable optical disc to modify the optimal write power and to calculate a criterion of writing quality. Thereafter a following detecting position is modified based on the criterion of writing quality and data recording is restarted in the program area with the modified optimal write power until the recording position exceeds or is equal to the modified following detecting position.

According to the claimed invention, the recordable disc drive further comprises a step of performing OPC to calculate a β value for compensating the optimal write power and for amending a write strategy.

According to the claimed invention, the criterion of writing quality is a jitter value.

According to the claimed invention, the method further comprises a step of lowering a recording speed when the jitter value is extremely higher than a specified value.

According to the claimed invention, an interval between the modified following detecting position and the current detecting position is set to be longer than a basic distance when the jitter value is lower than the specified value.

According to the claimed invention, an interval between the modified following detecting position and the current detecting position is set to be shorter than a basic distance when the jitter value is close to or higher than the specified value.

The present invention further provides a method for dynamically detecting writing quality of a recordable optical disc. According to the method, firstly a current detecting position located on a program area of the recordable optical disc is set. Then the recordable disc drive proceeds data recording in the program area with an optimal write power. The recordable disc drive paused data recording when a recording position exceeds or is equal to the current detecting position. Then the recordable disc drive reproduces pre-recorded data in the tracks of the recordable optical disc to perform OPC for modifying the optimal write power and calculating a read error rate. Thereafter a following detecting position is modified based on the read error rate and data recording is restarted in the program area with the modified optimal write power until the recording position exceeds or is equal to the modified following detecting position.

According to the claimed invention, performing OPC further comprises a step of calculating a $\beta$ value for compensating the optimal write power.

According to the claimed invention, performing OPC further comprises a step of calculating a $\beta$ value for amending a write strategy.

According to the claimed invention, the method further comprises a step of lowering a recording speed when the read error rate is extremely higher than a specified value.

According to the claimed invention, an interval between the modified following detecting position and the current detecting position is set to be longer than a basic distance when the read error rate is lower than the specified value.

According to the claimed invention, an interval between the modified following detecting position and the current detecting position is set to be shorter than a basic distance when the read error rate is close to or higher than the specified value.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

Figure 1:
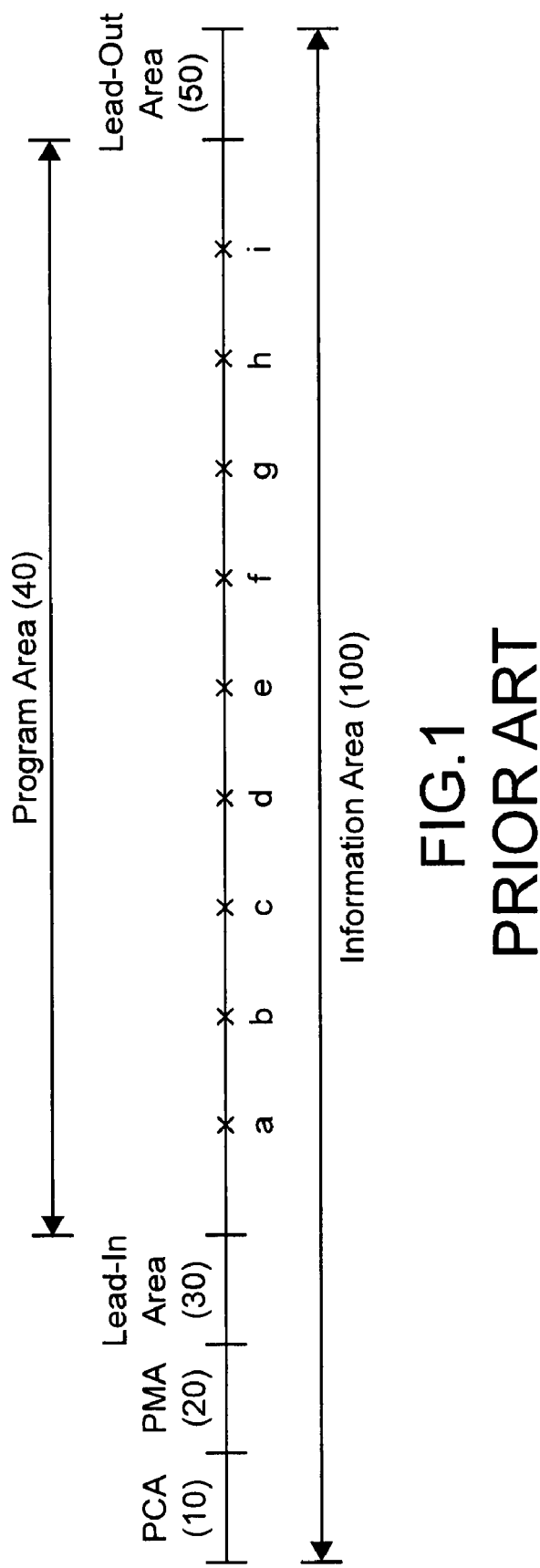
FIG. 1 is a diagram of an information area of a recordable optical disc.
Figure 2:
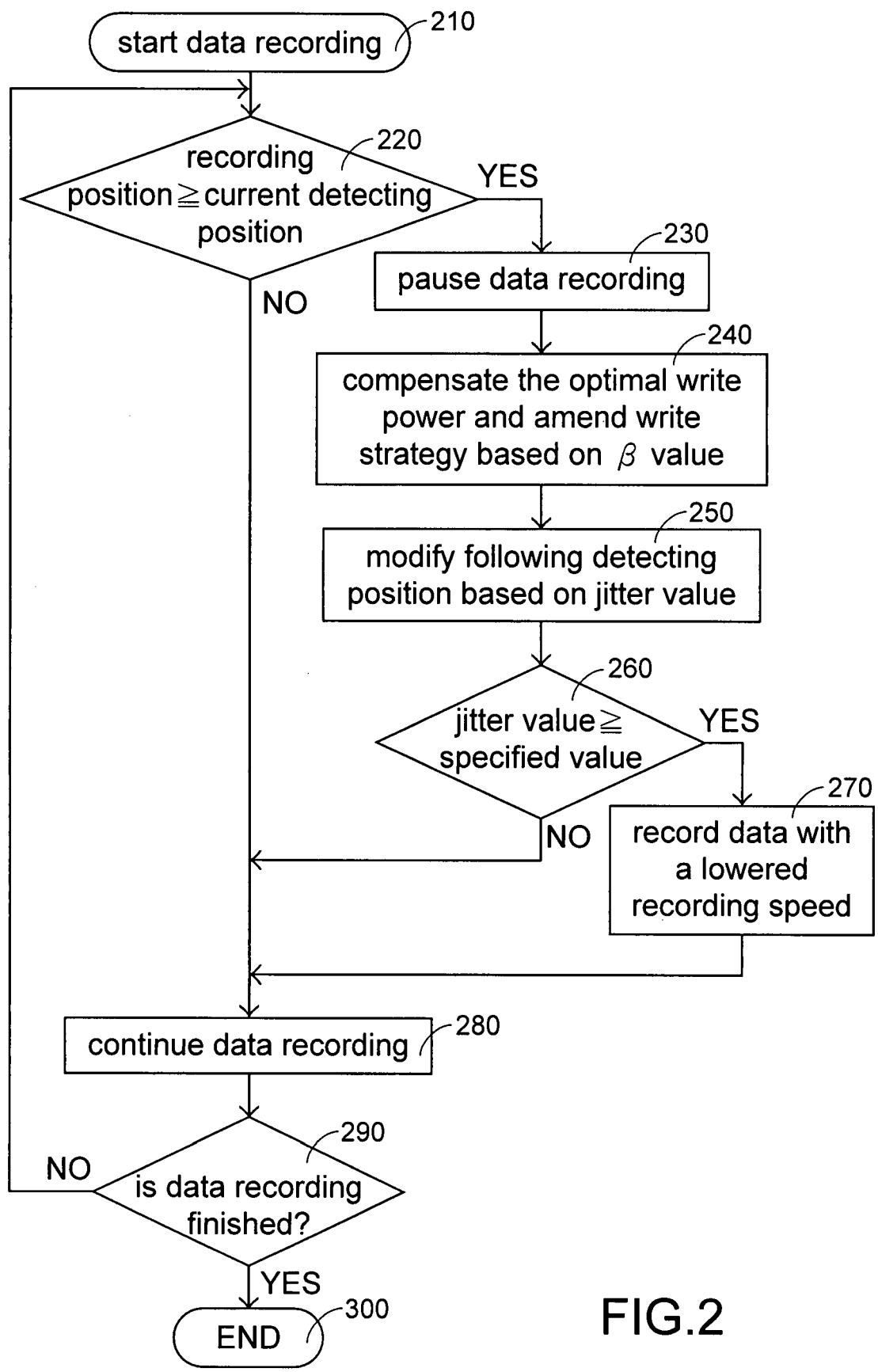
FIG. 2 is a flowchart illustrating a method of dynamically detecting writing quality of a recordable optical disc.

Refer to FIG. 2, which is a flowchart illustrating a method of dynamically detecting writing quality of a recordable optical disc. Firstly, the recordable disc drive starts data recording (step 210). Then a recording position on tracks of the recordable optical disc is detected by the recordable disc drive during the process of data recording (step 220). If the recording position does not exceed the current detecting position, the recordable disc drive continues data recording (step 280). On the contrary, if the recording position exceeds or is equal to the current detecting position, the recordable disc drive temporarily stops data recording (step 230). Moreover, when the recordable disc drive paused data recording, the recordable disc drive controls the optical pickup head jumping to the tracks before the position where data recording is paused. The pre-recorded data recorded on the tracks is reproduced for performing OPC and a modified optimal write power is thus calculated based on the pre-recorded data. The recordable disc drive reproduces the pre-recorded data recorded on the tracks and calculates the $\beta$ value of the pre-recorded data for compensating the optimal write power and amending write strategy in current embodiment (step 240).

After step 240, when the modified optimal write power is determined, a jitter value of the pre-recorded data recorded on the tracks is further calculated and the following detecting position is determined based on the jitter value in current embodiment (step 250). To be more specific, the jitter value represents the writing quality of the recordable optimal disc. When the jitter value is quite low, it means that the writing quality of the recordable optical disc is good. Thus, the modified following detecting position and the current detecting position separated by a longer interval is determined based on the low jitter value. On the contrary, when the jitter value is quite high, it means that the writing quality of the recordable optical disc is less good. Thus. The modified detecting position and the current detecting position separated by a shorter interval is determined based on the high jitter value. In the proceeding step, the recordable disc drive determines whether or not to lower the rotation speed of the recordable disc drive based on the measured jitter value (step 260). In general, when the jitter value, for example 20%, is extremely higher than the specified jitter value (9%), the recording speed of the recordable disc drive must be lowered, i.e. the recordable disc drive lowered the recording speed (step 270). If not, the recordable disc drive maintains the recording speed. After step 270, the recordable disc drive controls the optical pickup head returning to the position where the data recording is paused and continues restart data recording (step 280).

In the following step, when it is determined that data recording is not finished, the recordable disc drive detects the relation between the recording position on the tracks of the recordable optical disc and the modified following detecting position, step 230 to step 260 are proceeded again and again until data recording is finished (step 300).

Figure 3:
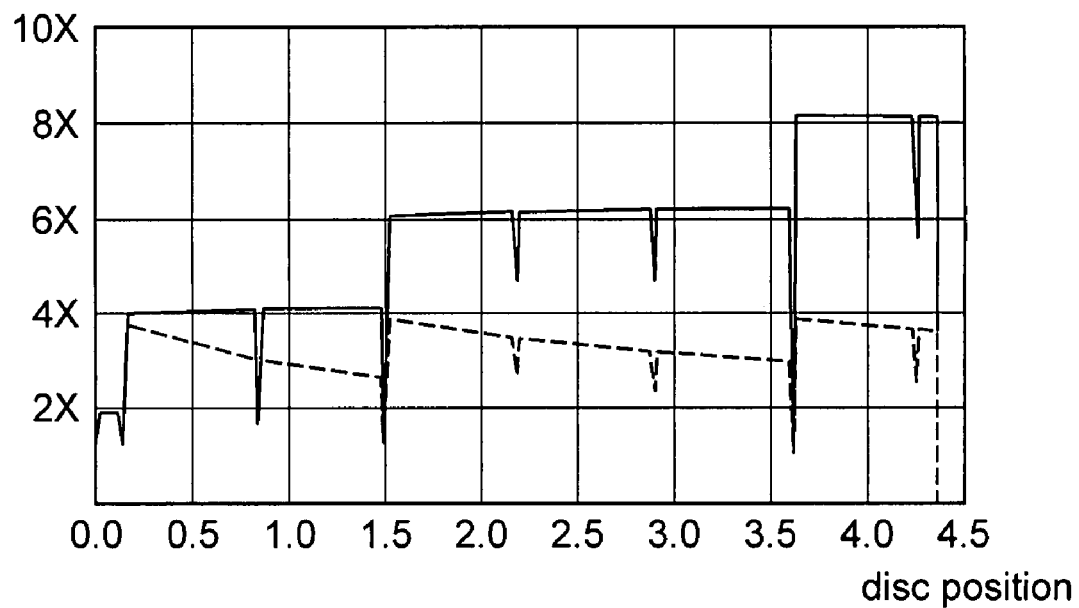
FIG. 3 is a diagram illustrating the recordable disc drive proceeds data recording on the recordable optical disc with ZCLV when the writing quality of the recordable optical disc is good.
Figure 4:
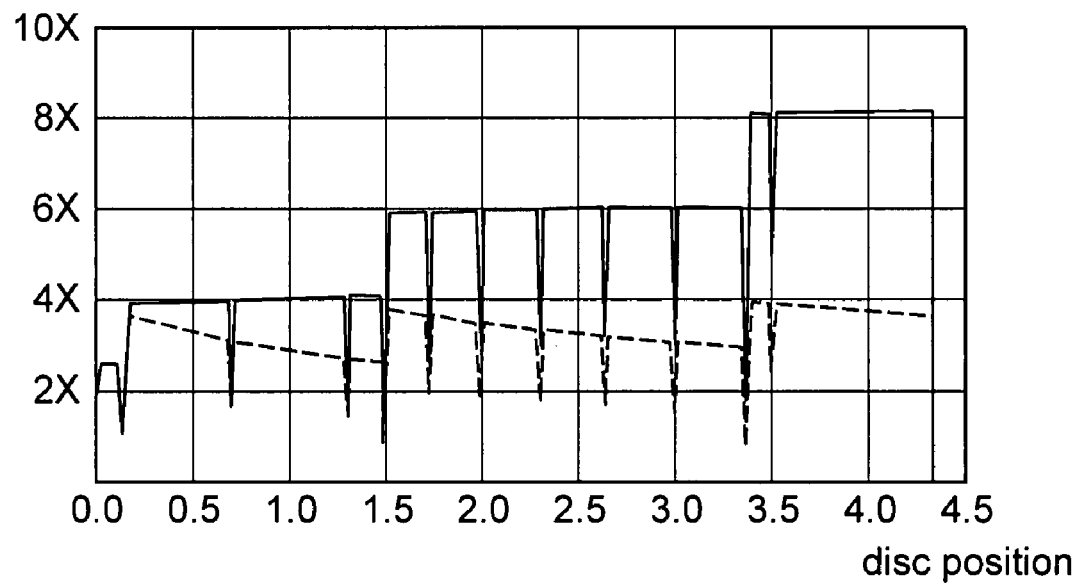
FIG. 4 is a diagram illustrating the recordable disc drive proceeds data recording on the recordable optical disc with ZCLV when the writing quality of the recordable optical disc is less good.

The detecting positions can be adjusted dynamically according to the current embodiment of the present invention. To be more specific, if the writing quality of the recordable optical disc is very good, the interval between the following detecting position and the current detecting position is extended. On the contrary, if the writing quality of the recordable optical disc is less good, the interval between the following detecting position and the current detecting position is shorten. Moreover, the writing quality of the recordable optical disc is determined based on the jitter value. For example, assume that the basic interval between the detecting positions is L. If the writing quality of the recordable optical disc is very good, i.e. the jitter value is less than 3%, the interval between the following detecting position and the current detecting position is set to 1.5 L. And if the writing quality of the recordable optical disc is less good, i.e. the jitter value is 10%, the interval between the following detecting position and the current detecting position is set to 0.8 L. And also if the writing quality of the recordable optical disc is really bad, the recording speed of the recordable disc drive is to be lowered. Wherein, FIG. 3 is a diagram illustrating the recordable disc drive proceeds data recording on the recordable optical disc with zoned constant linear velocity (hereinafter, ZCLV) when the writing quality of the recordable optical disc is good. The abscissa represents disc position, while the ordinate represents data recording speed. Because the recordable disc drive adopts ZCLV, the dotted line represents the rotating speed of the recordable disc drive while the solid line represents the data recording speed of the recordable disc drive. Besides, the detecting positions are located on the positions where data recording speed or the rotation speed of the recordable disc drive is sharply reduced. Thus, the intervals between the detecting positions are extended when the writing quality of the recordable optical disc is good. That is to say, there're fewer detecting positions on the recordable optical disc when the writing quality of the recordable optical disc is good. FIG. 4 is a diagram illustrating the recordable disc drive proceeds data recording on the recordable optical disc with ZCLV when the writing quality of the recordable optical disc is less good. Thus, the intervals between the detecting positions are shortened when the writing quality of the recordable optical disc is less good. That is to say, there're more detecting positions on the recordable optical disc when the writing quality of the recordable optical disc is less good.

Thus, the present invention can not only proceed running OPC but also determine the following detecting position for proceeding running OPC based on the measured jitter value of the recordable optical disc. The present invention effectively reduces the time spent for data recording and also maintains good writing quality.

Furthermore, step 250 and step 260 illustrated in FIG. 2 both adopts the jitter value as the criterion of proceeding the following step. There're still other criteria which can also represent the writing quality of the recordable optical disc just as the jitter value does. For example, step 250 may adopt data read error rate to determine the writing quality of the recordable optical disc and modify the following detecting position based on the data read error rate. And step 260 determines whether or not to proceed step 270 (the recordable disc drive lowered the rotation speed) if the data read error rate is extremely higher than a threshold. To be more specific, the data read error rate is low represents the writing quality of the recordable optical disc is good. The intervals between the detecting positions are extended. On the contrary, the data read error rate is very high represents the writing quality of the recordable optical disc is bad. The intervals between the detecting positions are shortened.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for dynamically detecting writing quality of a recordable optical disc, comprising:

setting a current detecting position located on a program area of the recordable optical disc;

proceeding data recording in the program area with an optimal write power;

pausing data recording when a recording position exceeds or is equal to the current detecting position;

reproducing pre-recorded data in the tracks of the recordable optical disc to modify the optimal write power and to calculate a criterion of writing quality;

modifying a following detecting position based on the criterion of writing quality; and restarting data recording in the program area with the modified optimal write power until the recording position exceeds or is equal to the modified following detecting position.

2. The method according to claim 1 wherein the reproducing step further comprises steps of:

performing OPC to calculate a β value for compensating the optimal write power.

3. The method according to claim 1 wherein the reproducing step further comprises steps of:

performing OPC to calculate a β value for amending a write strategy.

4. The method according to claim 1 wherein the criterion of writing quality is a jitter value.

5. The method according to claim 4 wherein the method further comprises steps of:

lowering a recording speed when the jitter value is extremely higher than a specified value.

6. The method according to claim 4 wherein an interval between the modified following detecting position and the current detecting position is set to be longer than a basic distance when the jitter value is lower than the specified value.

7. The method according to claim 4 wherein an interval between the modified following detecting position and the current detecting position is set to be shorter than a basic distance when the jitter value is close to or higher than the specified value.

8. A method for dynamically detecting writing quality of a recordable optical disc, comprising:

setting a current detecting position located on a program area of the recordable optical disc;

proceeding data recording in the program area with an optimal write power;

pausing data recording when a recording position exceeds or is equal to the current detecting position;

reproducing pre-recorded data in the tracks of the recordable optical disc to perform OPC for modifying the optimal write power and calculating a read error rate;

modifying a following detecting position based on the read error rate; and restarting data recording in the program area with the modified optimal write power until the recording position exceeds or is equal to the modified following detecting position.

9. The method according to claim 8 wherein performing OPC further comprises steps of:

calculating a β value for compensating the optimal write power.

10. The method according to claim 8 wherein performing OPC further comprises steps of:

calculating a β value for amending a write strategy.

11. The method according to claim 8 wherein the method further comprises steps of:

lowering a recording speed when the read error rate is extremely higher than a specified value.

12. The method according to claim 8 wherein an interval between the modified following detecting position and the current detecting position is set to be longer than a basic distance when the read error rate is lower than the specified value.

13. The method according to claim 8 wherein an interval between the modified following detecting position and the current detecting position is set to be shorter than a basic distance when the read error rate is close to or higher than the specified value.

* * * * *